United States Patent

Grotewald et al.

[15] 3,638,695

[45] Feb. 1, 1972

[54] APPARATUS FOR PREPARING CITRUS HALVES

[72] Inventors: Hans W. Grotewald, Sebring, Fla. 33870; Don S. Bryan, Box 154, Bartow, Fla. 33830

[22] Filed: Jan. 26, 1970

[21] Appl. No.: 5,611

[52] U.S. Cl. ..................................146/3 R, 146/3 N, 146/72
[51] Int. Cl. ..........................................................A23n 15/02
[58] Field of Search ......................146/3 R, 3 K, 3 N, 72, 236

[56] References Cited

UNITED STATES PATENTS

| 2,735,466 | 2/1956 | Krstinich | 146/72 |
|---|---|---|---|
| 3,241,586 | 3/1966 | Petersen et al. | 146/72 X |
| 3,363,655 | 1/1968 | Belk | 146/3 N |
| 3,431,955 | 3/1969 | Heymann | 146/3 N |

*Primary Examiner*—William S. Lawson
*Attorney*—Buell, Blenko & Ziesenheim

[57] ABSTRACT

An apparatus and method are provided for preparing citrus halves such as grapefruit for the table, comprising a Vee trough conveyor means receiving and transferring a generally spherical fruit with its axis transverse to its path of travel, a cutter in the path of said conveyor bisecting the angle of the Vee trough and cutting the fruit carried thereby, a moving table receiving the cut portions of fruit from the Vee conveyor and moving such portions away from the cutter, a cutter table adjacent said moving table, a first driven shaft moving vertically axially beneath said table, said shaft having a radial arm on the upper end thereof, a vertical cutter adjustable on said arm, an annular opening in the table through which said cutter projects when said first shaft is raised, means acting on said first shaft selectively to raise and lower the same, a second driven shaft spaced from the first, movable vertically axially beneath the table, a hole cutter on said shaft, an opening in the table through which said hole cutter extends when said second shaft is raised, means acting on said second shaft selectively to raise and lower the same, stop means on the tabletop adjacent each of the annular opening and the hole cutter opening whereby halves of fruit are positioned and drive means acting on each of the first and second shafts.

8 Claims, 12 Drawing Figures

INVENTORS
Hans W. Grotewold &
Don S. Bryan

INVENTORS
Hans W. Grotewold &
Don S. Bryan their attorneys

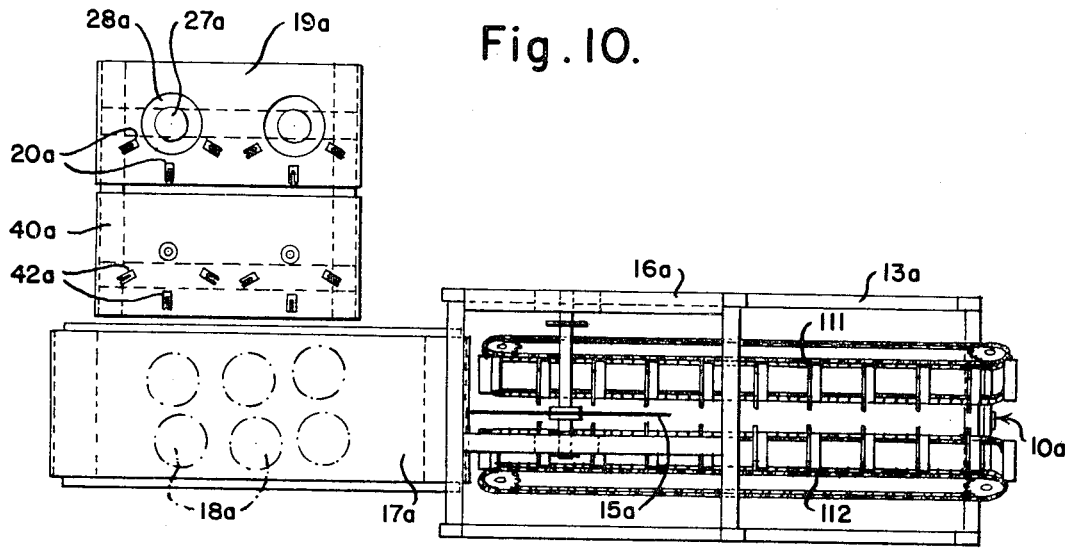

APPARATUS FOR PREPARING CITRUS HALVES

This invention relates to methods and apparatus for preparing citrus halves and particularly to a method and apparatus for cutting citrus halves so that the fruit segments or sections can be easily removed from the albedo, free of seeds and membrane.

The preparation of citrus halves, such as grapefruit halves for restaurants, cafeterias and the like, has for years posed a problem. It is desirable that the fruit section be loosened from the albedo and that the seeds and core be largely removed in the case where seeds are present and the core cut in the case of seedless fruit, so that the consumer can readily remove the section with a suitable spoon. This problem has reached such proportions that many restaurants and cafeterias will not serve grapefruit halves because of the high cost of preparation.

We have developed an apparatus and method which makes the preparation of grapefruit and other citrus halves easy and inexpensive. We have found that the fruit can be satisfactorily prepared without actually separating each segment from the albedo. Our research has shown that if the fruit is cut adjacent the albedo to a depth of about one-quarter inch on the average and the center core cut out to a depth of about 1½ inches and about 1 inch or more in diameter, the fruit sections can be easily removed without disturbing the dividing membrane and with substantial freedom from seeds. If the cut adjacent the rind exceeds about one-half of an inch, then the dividing membrane tends to tear away from the rind when the section is removed from the fruit whereas if the cut is less, the membrane will remain attached and the section will remove readily with a spoon. The same is true with the core cutting or removal if the cut is too deep the membrane tends to tear on removal of the section. Accordingly, we preferably cut only about one-half inch in depth at the core and to remove the core only if seeds are present.

In a preferred embodiment of our invention, we provide a V-trough conveyor means adapted to receive and transfer a spherical object, a cutter in the path of said conveyor adapted to cut diametrically across a sphere carried in said conveyor, a moving table receiving the cut portions of the sphere from said conveyor, a cutter table adjacent said moving table, a first driven shaft extending vertically beneath said table, said shaft having a radial arm on the end thereof nearest the table surface, a vertical cutter adjustable radially on said arm, an annular opening in the table through which said cutter is adapted to project when raised, means acting on said first shaft selectively to raise and lower the same, a second driven shaft extending vertically beneath the said cutter table, said second shaft carrying a hole cutter on the axis of said shaft, an opening in said table through which said hole cutter passes when raised, means acting on said second shaft to selectively raise and lower the same and adjustable stop means on the cutter tabletop adjacent each of the annular opening and the hole cutter opening whereby the halves of fruit are positioned. Preferably the movable cutter on the radial arm is a hook-type cutter rotated at slow speed and the hole cutter is a drill bit rotated at relatively higher speed. Preferably the first cutter shaft or shafts are mounted for rotation on a vertically movable plate connected to a fluid activated cylinder controlled by an operator. Similarly the hole cutter is preferably mounted on the driven shaft of a motor which is mounted on a vertically movable plate connected to a fluid-activated cylinder controlled by an operator. The fluid-operated cylinders may be air cylinders or hydraulic cylinders. The V-trough conveyor may be a pair of belt conveyors, a lug conveyor or any other suitable means.

In the foregoing general description, we have set out certain objects, purposes and advantages of our invention. Other objects, purposes and advantages of this invention will be apparent from a consideration of the following description and the accompanying drawings in which:

FIG. 10 is a top plane view of a second embodiment of the apparatus of this invention.

Figure 1:
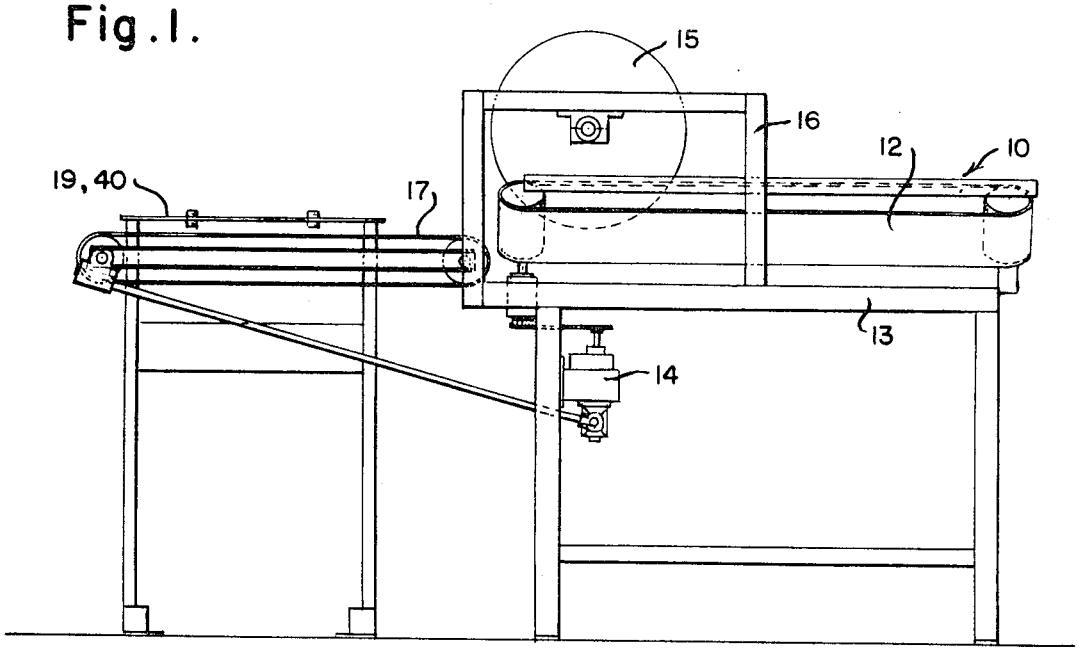
FIG. 1 is a side elevation of an apparatus according to our invention.

Referring to the drawings we have illustrated a V-trough conveyor 10 formed by two belt conveyors 11 and 12 mounted on a table 13 at an angle of about 90° to each other and driven at the same speed from a common drive motor 14. A rotary cutter wheel 15 is mounted on a support frame 16 bisecting the angle between conveyors 11 and 12. Citrus fruit to be prepared are placed between conveyors 11 and 12, with their cores parallel to the axis of cutter wheel 15, and carried beneath wheel 15 where they are cut in half and discharged onto moving table 17. Each pair of halves 18 is picked up from table 17 and placed cut face down on table surface 19 with the periphery of each half engaging three movable stops 20 bolted in slots 21 in the tabletop. Air cylinder 22 is then actuated by the operator which raises plate 23 on guideposts 24 against stop 25 on the underside of support head 27 which with tabletop 19 forms annular slot 28. Plate 23 carries with it annular shafts 29 and 29a which are journaled for rotation on the vertical guideposts 24. A motor 30 mounted on plate 23 drives one shaft 29a by means of sprocket 31 on the motor and sprocket 32 on shaft 29a by means of chain 31a. The other shaft 29 is driven from first shaft 29a by means of a chain 33 and sprockets 34 on shaft 29 and 35 on shaft 29a. A cutter arm 36 extends radially from the upper end of each of shafts 29 and 29a and is provided with an adjustable blade 37 which, when the plate 23 is raised, extends through annular slot 28 approximately one-quarter inch to cut around each half adjacent the junction of the sections and albedo to provide an outer cut 38.

Figure 3A:
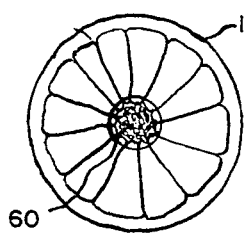
FIGS. 3a–3c are plan views of a citrus half cut according to our invention.
Figure 3B:
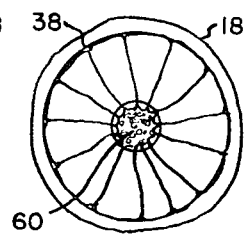
Figure 3C:
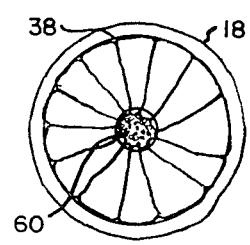
Figure 4:
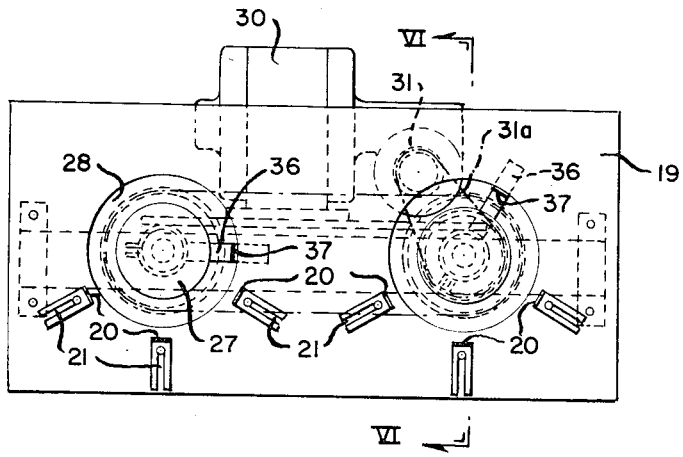
FIG. 4 is an enlarged plan view of the outer cutter arrangement of our invention.
Figure 5:
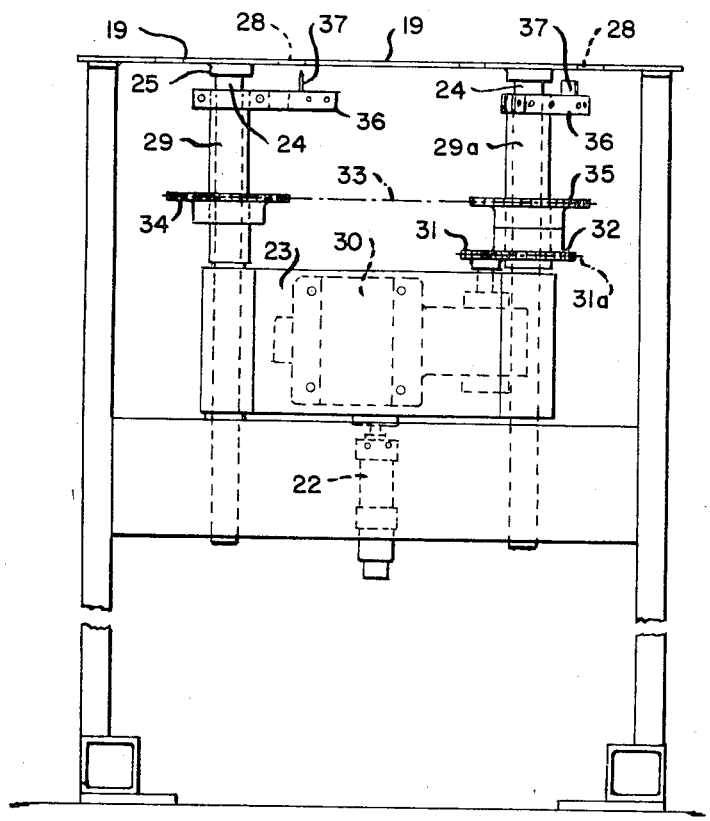
FIG. 5 is an end elevational view of FIG. 4.
Figure 6:
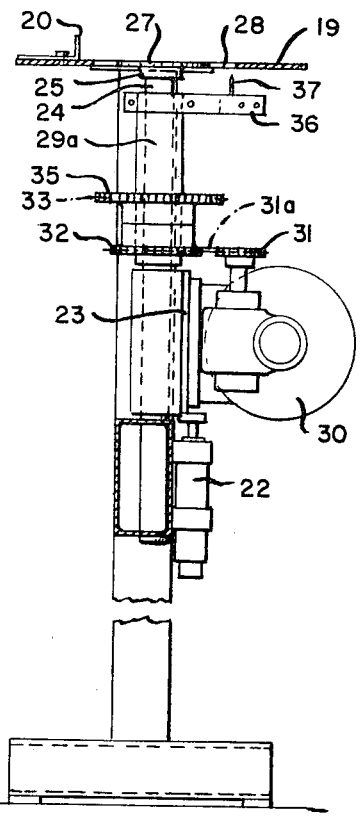
FIG. 6 is a section, partly broken away, on the line VI—VI of FIG. 4.
Figure 7:
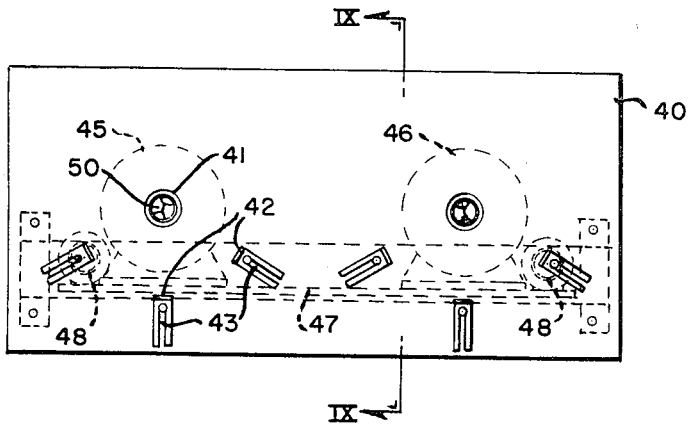
FIG. 7 is an enlarged fragmentary plan view of the core cutter arrangement of our invention.
Figure 8:
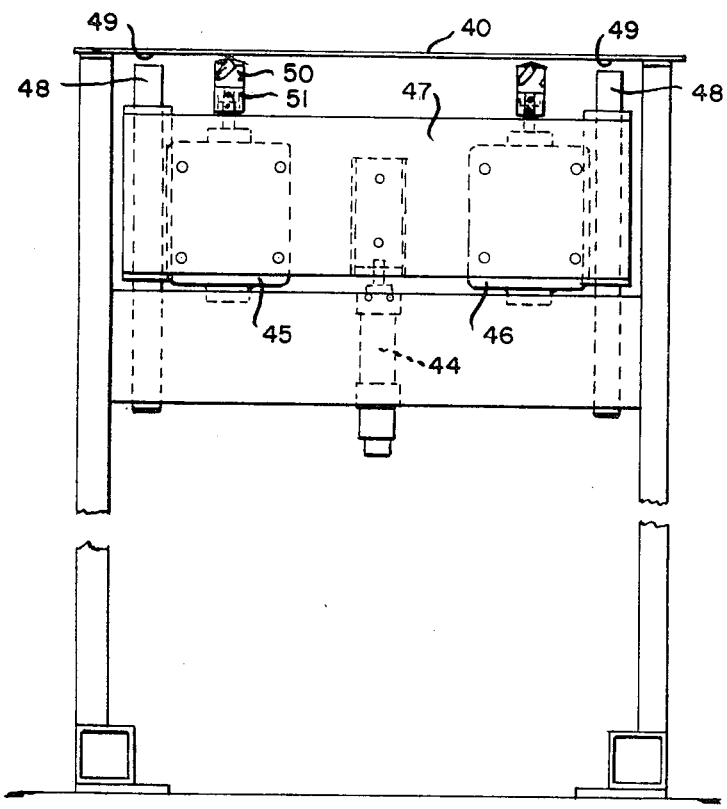
FIG. 8 is an end elevational view of FIG. 7.
Figure 9:
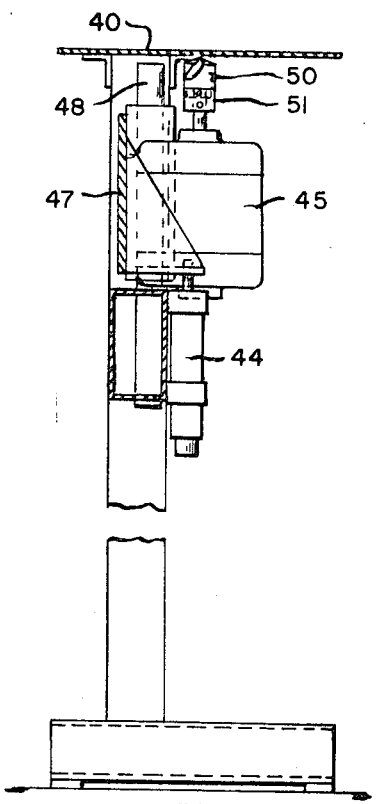
FIG. 9 is a section on the line IX—IX of FIG. 7.

As soon as the outer cut is completed, the cut halves are moved to table 40 over holes 41 and with their periphery against stops 42 which are movably mounted in slots 43 in table top 40. Air cylinder 44 is energized along with motors 45 and 46 on plate 47. Cylinder 44 moves plate 47 on vertical guides 48 upwardly against stops 49 beneath tabletop 40. Bits 50 are mounted in chucks 51 on motors 45 and 46 and when plate 47 moves upwardly, these bits are moved through holes 41 and into the core 60 of halves 18 to remove a portion of the core. The bit moves upwardly about one-half inch above the tabletop surface 40. Where the citrus half has seeds a drill bit about 1¼ inches in diameter is used so as to remove both core and seeds. Such a cut is shown in FIG. 3a. Where seedless fruit are being handled, the bit size is reduced and the core is cut around as shown in FIG. 3c by a hollow annular cutter and left in place.

Figure 2:
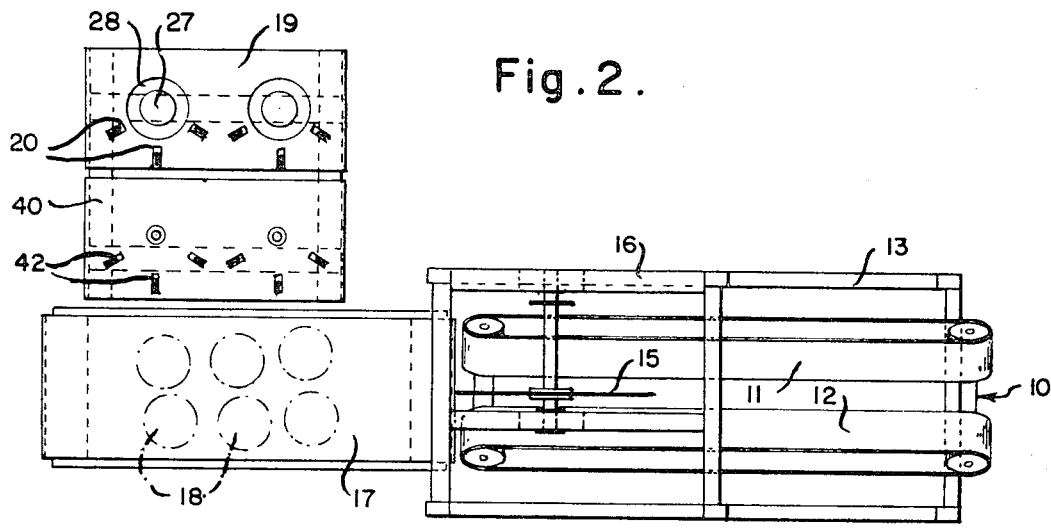
FIG. 2 is a top plan view of the apparatus of FIG. 1.

In FIG. 10 we have illustrated a second embodiment of this invention in which the V-trough conveyor 10a is formed by two lug chains mounted on table 13a at an angle of about 90° to each other and driven at the same speed from a common drive motor 14a. All of the parts in this assembly are the same as those shown in FIG. 2 except for the lug chain conveyor and all like parts bear like numbers with the suffix a added.

While we have illustrated and described certain presently preferred embodiments and practices of our invention in the foregoing specification, it will be understood that this invention may be otherwise embodied within the scope of the following claims.

We claim:

1. An apparatus for preparing citrus fruit halves comprising a V-trough conveyor means receiving and transferring a generally spherical fruit with its axis transverse to its path of travel, a cutter in the path of said conveyor bisecting the angle of the V-trough and cutting the fruit carried thereby, a moving table receiving the cut portions of fruit from the V-conveyor and moving such portions away from the cutter, a cutter table adjacent said moving table, a first-driven shaft moving vertically axially beneath said table, said shaft having a radial arm on the upper end thereof, a vertical cutter adjustable on said arm, an annular opening in the table through which said cutter projects when said first shaft is raised, means acting on said first shaft selectively to raise and lower the same, a second driven shaft spaced from the first, movable vertically axially beneath the table, a hole cutter on said shaft, an opening in the table through which said hole cutter extends when said second shaft is raised, means acting on said second shaft selectively to raise and lower the same, stop means on the tabletop adjacent each of the annular opening and the hole cutter opening whereby halves of fruit are positioned and drive means acting on each of the first and second shafts.

2. An apparatus as claimed in claim 1 wherein the V-conveyor is a pair of spaced belt conveyors operating in two intersecting planes.

3. An apparatus as claimed in claim 1 wherein the V-conveyor is a pair of lug chains.

4. An apparatus as claimed in claim 1 wherein the vertical movement of each of the first and second shafts is produced by fluid cylinders.

5. An apparatus as claimed in claim 4 wherein the fluid cylinders are air cylinders.

6. An apparatus as claimed in claim 1 wherein the adjustable cutter is a hook-type cutter.

7. An apparatus as claimed in claim 1 having a pair of first hollow cylindrical driven shafts spaced apart beneath the cutter table and journaled for rotation around a pair of spaced parallel vertical posts fixed to the table, a vertically movable plate on said posts moving said first shafts vertically on said guideposts, a radial arm on the upper end of each said shafts, a vertical cutter on each said radial arm movable radially thereon, drive means on said vertically movable plate, connections between said drive means and said pair of first-driven shafts and fluid actuator means on the table acting on the vertically movable plate to raise and lower the same relative to the tabletop.

8. An apparatus as claimed in claim 1 wherein a pair of spaced second shafts are provided each being driven by a drive motor, a vertically movable plate carrying said drive motors, said plate being movably mounted on spaced vertical guideposts on said table, a hole cutter on each said second shafts and fluid actuator means on the table acting on the vertically movable plate to raise and lower the same relative to the tabletop.

* * * * *